United States Patent [19]

Kanazawa et al.

[11] 4,091,147

[45] May 23, 1978

[54] WELDED STEEL PRODUCTS HAVING LOW SENSITIVITY TO WELD CRACKING AND A PRODUCTION METHOD THEREOF

[75] Inventors: Shogo Kanazawa, Kamakura; Akira Nakashima, Hiratsuka; Kazunari Yamato, Sagamihara; Naoyuki Seriu, Machida; Tohru Watanabe, Fukuoka; Susumu Nakazawa, Sagamihara, all of Japan

[73] Assignee: Nippon Steel Corporation, Tokyo, Japan

[21] Appl. No.: 738,700

[22] Filed: Nov. 4, 1976

[30] Foreign Application Priority Data

Nov. 7, 1975 Japan .................... 50-133012

[51] Int. Cl.$^2$ ............................. B32B 15/18
[52] U.S. Cl. .................. 428/683; 75/123 AA; 75/123 E; 75/126 G; 75/126 M; 75/128 P; 75/128 E; 219/146.1; 228/263
[58] Field of Search .......... 428/683; 219/145, 146; 228/263; 75/123 AA, 123 E, 126 M, 126 G, 128 PE, 124, 125

[56] References Cited

U.S. PATENT DOCUMENTS

| | | | |
|---|---|---|---|
| 3,557,340 | 1/1971 | Srivastava | 75/123 AA |
| 3,679,400 | 7/1972 | Nachtman | 75/123 E |
| 3,762,915 | 10/1973 | Heine et al. | 75/123 AA |
| 3,846,186 | 11/1974 | Tipnis | 75/126 M |
| 3,909,253 | 9/1975 | Asnis et al. | 75/170 |

FOREIGN PATENT DOCUMENTS

| | | | |
|---|---|---|---|
| 1,259,683 | 1/1968 | Germany | 75/123 E |
| 44-19972 | 8/1969 | Japan | 75/123 AA |
| 970,866 | 9/1964 | United Kingdom | 75/123 E |
| 471,977 | 9/1975 | U.S.S.R. | 75/123 E |

OTHER PUBLICATIONS

"Filler Wire for Welding Army Ordinance Armor," Welding Journal, vol. 38, May 1959, pp. 232s–240s.

*Primary Examiner*—Arthur J. Steiner
*Attorney, Agent, or Firm*—Wenderoth, Lind & Ponack

[57] ABSTRACT

A welded steel product having a low sensitivity to weld cracking, produced by welding a base steel material comprising at least one member selected from the group consisting of rare earth metal, Ca, Ba, Te and Se using a welding material comprising at least one member selected from the group consisting of rare earth metals, Te and Se, and having a weld metal containing at least one rare earth metal in an amount of 0.0005 to 0.10% and at least one of Te and Se in an amount not more than 0.10%.

6 Claims, No Drawings

WELDED STEEL PRODUCTS HAVING LOW SENSITIVITY TO WELD CRACKING AND A PRODUCTION METHOD THEREOF

BACKGROUND OF INVENTION

1. Field of Invention

The present invention relates to welded steel products having remarkably lowered sensitivity to weld cracking and a production method thereof.

2. Description of Prior Art

In welding of steel structurals, weld cracking (cold cracking or delayed cracking) has been one of the most serious problems.

Weld cracking occurs in metal of the weld, heat affected zones and sometimes base metals near the affected zones, either at temperatures below 150° C when the process of cooling is coming to an end or during a long period after attaining the ordinary temperatures.

As for the means to prevent such weld cracking various welding methods have been proposed and practised, such as use of low-hydrogen welding rods, modification of welding designs to lower restraint of the weld joints and application of preheating and postheating. However, such heating procedure has been a troublesome operation for welding operators.

Meanwhile, from the aspect of the steel materials, various trials have been made for lowering the sensitivity of the steel materials to the weld cracking such as by lowering contents of harmful alloying elements which cause or promote the weld cracking.

However, the harmful elements which cause the weld cracking are generally necessary for enhancing the steel strength and hardenability, and thus in case of a steel having a high tensile strength from 50 to 80 kg/mm$^2$, the lowering of the alloying elements is limited.

SUMMARY OF INVENTION

Therefore, one of the objects of the present invention is to provide welded steel products having remarkably lowered sensitivity to weld cracking and a production method thereof, which are free from the above difficulties.

The welded steel products according to the present invention can be produced by adding to welding materials and/or steel materials, a very small amount of certain elements having special effects for prevention of weld cracking. The most important advantage of the present invention lies in the fact that when high tensile strength steels having a tensile strength as high as 50 to 80 kg/mm$^2$, which have been regarded as a steel having a very high sensitivity to the weld cracking, are welded without preheating, there is absolutely no problem of weld cracking.

The features of the present invention lie in that the welded steel product is produced by welding a steel material (base metal) containing at least one of the rare earth metals and/or at least one of Te and Se using a welding material containing at least one of the rare earth metals and/or at least one of Te and Se, and that thus welded steel product contains in its weld metal 0.0005 – 0.10% of at least one of the rare earth metals and not more than 0.10% of at least one of Te and Se.

The rare earth metals used in the present invention are yttrium and elements having atomic numbers from 57 to 71, and herein called REM.

According to the present invention, a steel material such as ordinary mild steels and high tensile steels containing desirably 0.005 to 0.30% of at least one of REM and/or 0.005 to 0.2% of at least one of Se and Te is welded using a welding material containing desirably 0.005 to 0.30% of at least one of REM and/or 0.005 to 0.2% of at least one of Se and Te, by an ordinary welding method, such as a shielded metal arc welding, a submerged arc welding, a semi-automatic welding (CO$_2$ arc welding and MIG welding), an electro-gas welding and an electro-slag welding, and the steel material thus welded has a weld metal containing 0.0005 to 0.1%, preferably 0.0005 to 0.025%, of at least one of REM and 0.0005% to 0.10% of at least one of Te and Se. The welded steel product thus obtained is very excellent in respect of resistance against the sensitivity to the weld cracking.

Another object of the present invention is to provide a method for producing the above welded steel product.

According to the present invention, at least one of REM and at least one of Te and Se may be introduced into the molten pool either of the steel material to be welded or the welding material.

When at least one of Te and Se and at least one of REM coexist in the weld metal, remarkable resistance against the weld cracking which cannot be expected from REM alone or from Te or Se alone can be obtained.

The term "welding material" includes all materials used for the welding such as filler metals in rod, wire or electrode form, coating materials and fluxes.

The present invention is applicable to ordinary mild steels and high tensile steels, comprising 0.02 to 0.20% C, 0.1 to 1.0% Si, 0.3 to 3.0% Mn, and optionally one or more of 0.05 to 2.0% Cu, 0.05 to 6.0% Ni, 0.05 to 3.0% Cr, 0.05 to 2.0% Mo, 0.01 to 0.10% V, 0.01 to 0.10% Nb, 0.01 to 0.12% sol.Al, 0.0005 to 0.005% B, 0.01 to 0.12% Ti, 0.01 to 0.12% Zr, 0.0005 to 0.01% Ca, 0.005 to 0.3% of REM and 0.005 to 0.2% of Se or Te with the balance being iron and unavoidable impurities.

The steels used in the present invention may be prepared by melting in a converter, an electric furnace, etc., if necessary, subjecting to vacuum degasing treatment, breaking-down or continuous casting to slabs, and hot rolling to hot rolled products such as sheets and bars. The hot rolled products may be used directly in the present invention, or if necessary, they may be subjected to heat treatments such as normalizing, quenching and tempering to give required strength and toughness. It should be understood that the desired results of the present invention can be obtained irrespective of the method of producing the steel materials and their heat treatments.

DETAILED DESCRIPTION OF INVENTION

Reasons for the limitations of the steel composition will be described hereinbelow.

REM is one of the most important elements for the welded steel product according to the present invention.

In general, weld cracking is caused by the hydrogen content, the hardened structure and the restraining force, and of any one of these factors is below a certain value no weld cracking is caused. The prevention of weld cracking by preheating or postheating removes the hydrogen by heat and lowers the hydrogen content in the weld metal. In fact, the desirable effect of REM is related to the hydrogen in such a way that REM inclusions absorb the hydrogen penetrating into the heat affected zone (HAZ) from the weld metal so as to reduce the hydrogen content in the hardened structure of HAZ at which cracking is caused to a value below a critical value, thereby preventing the weld cracking. The above desirable effect of REM is obtained when REM is present in the base steel in an amount not less than 0.005%. On the other hand, REM contents more than 0.30% do not produce increased effect in proportion to the increased content, but rather produce adverse effects, such as lowering of the toughness.

In the present invention, Te and Se are factors as important as REM, and the desired results of the present invention are obtained by the combination of Te or Se with REM.

Te and Se are each effective to remarkably lower the hydrogen content in the weld metal, but when Te and/or Se is present in an amount more than 0.1% the toughness of the weld metal is lowered. Therefore, the upper limit of Te or Se in the weld metal is set at 0.10%. On the other hand, Te and/or Se contents less than 0.0005% in the weld metal does not produce the desired results. In order to maintain 0.0005 to 0.1% of Te and/or Se in the weld metal, 0.005 – 1g of Te and/or Se may be added to 100g of the molten pool from the welding material or the base steel material.

REM, when present in the base steel material, produces remarkable effect but when welded it is diluted by the weld metal and present in the weld metal in an amount not less than 0.0005%. On the other hand, when REM is present in the weld metal in an amount more than 0.10% adverse effect is caused on the toughness. Therefore the upper limit of REM content in the weld metal is set at 0.10%.

As for the method of addition of Te and/or Se to the weld metal, they may be introduced from either the filler metal or the coating material, or from both in case of the shielded metal arc welding, from either the wire or the flux or both in case of the submerged arc welding and the electro-slag welding, and from the wire (including a composite wire) in case of the semi-automatic welding and the electro-gas welding. When Te and/or Se are to be contained in the coating material or the flux, they are normally in the metallic form, but they may be in the form of their compounds, if they are to be introduced directly to the molten pool.

As for the method for admixing Te and/or Se in the welding materials so as to assure the required content of Te and/or Se in the molten pool, 0.005 to 0.20% of Te and/or Se is admixed in the filler metal or wire, or 0.01 to 5.0% of Te and/or Se is admixed in the coating material or flux.

Further, Te and/or Se may be added to the molten pool by coating metallic Te and/or Se or compounds of Te and/or Se on the welding grooves. Therefore, the welding grooves are covered by the welding material in the present invention.

It has been found also that Ca and Ba have an effect similar to as REM when contained in an amount of 0.0001 to 0.01% in the base steel material, which assures not more than 0.005% in the weld metal.

Explanations will be made hereinbelow on the desirable steel compositions of the mild steel and the high tensile strength steels used as the base steel material in the present invention.

Carbon is an essential element for maintaining the required strength, but carbon contents exceeding 0.20% increase remarkably the sensitivity to the weld cracking. On the other hand, carbon contents less than 0.02% do not give required strength.

Silicon is added as deoxidizer, and silicon contents outside the range from 0.1 to 1.0% do not produce its desired effect and deteriorate the toughness.

Manganese is essential for maintaining the hardenability, but with less than 0.3% of manganese no desired hardenability can be obtained, while with more than 3.0% of manganese the toughness lowered.

In order to maintain both the strength and the toughness, one or more of 0.05 to 2.0% of copper, 0.05 to 6.0% of nickel, 0.05 to 3.0% of chromium, and 0.05 to 2.0% of molybdenum is added. Contents of these elements exceeding their upper limits deteriorate the toughness.

Niobium and/or vanadium, when present even in a small amount from 0.01 to 0.10%, improve the strength, but their contents beyond the upper limit produce adverse effect on the toughness.

Soluble Al is added as deoxidizer and more than 0.12% of sol. Al deteriorates the toughness.

Boron is effective to increase hardenability, but boron contents less than 0.0005% do not produce the desired result and boron contents exceeding 0.005% lower the toughness remarkably.

Titanium and zirconium each in an amount from 0.01 to 0.12% are effective to fix nitrogen and to refine the grains, and 0.0005 to 0.01% of calcium is effective to deoxidize and desulfurize the steel.

Further, titanium, zirconium and calcium, if present together with REM, have ability to still further enhance the effects of REM.

Therefore, addition of Ti, Zr and Ca together with REM is very useful for obtaining still less sensitivity to weld cracking of a welded steel product having a thick plate thickness and thus being subjected to large restraint. However, contents of Ti, Zr and Ca exceeding their upper limits do not produce any substantial improvement in their effects.

Elements other than REM and Te and Se contained in the weld metal obtained by the present invention are added intentionally in order to assure the same level of strength and toughness of the weld metal as that of the base steel material, or they are inevitably introduced to the weld metal by dilution from the base metal material.

As for the desirable ranges of the various elements in the weld metal, the composition will be illustrated to comprise not more than 0.20% of carbon, not more than 1.0% of silicon, 0.3 to 5.0% of manganese, and optionally one or more of not more than 1.0% of copper, not more than 3.0% of chromium, not more than 10% of nickel, not more than 3.0% of molybdenum, not more than 0.12% of titanium, and not more than 0.12% of zirconium, with the balance being iron and unavoidable impurities. Contents of the above elements outside the above ranges should be avoided from the aspect of cracking resistance and toughness.

The present invention will be more clearly understood from the following examples.

EXAMPLE 1

Table 1 shows the chemical compositions of the steels used in the present invention, Table 2 shows covered electrodes used in the present invention, and Table 3 shows comparatively the chemical compositions and weld cracking property of the welded products produced with the above steels and the electrodes. The weld cracking test is in accordance with the Y-groove cracking test according to JIS Z3158. This method has been recognized as the most severe method among various test methods for determining the cold cracking sensitivity of a steel sheet, and has been widely used for determining with a high degree of safety a preheating temperature for prevention of weld cracking of a welded structure subjected to severe restraint conditions.

All of the steels shown in Table 1 have 80 kg/mm² or higher tensile strength and a similar level of strength and toughness as that of a commercially available similar grade of steel.

In Table 3, No. 5 represents a welded product produced by using a steel containing REM and a welding material containing no Te, No. 6 represents a welded product produced by using a steel containing no REM and a welding material containing Te, and No. 7 represents a welded product produced by using a commercially available steel of 80 kg/mm² tensile strength. All of Nos. 5 to 7 are outside the scope of the present invention.

Meanwhile, No. 1 to No. 4 and No. 8 to No. 10 in Table 3 represent welded steel products produced according to the present invention, using a steel containing REM and a welding material containing Te.

Results of Y-groove cracking tests on these welded products reveal that No. 7 requires preheating at 125° C for prevention of the cracking, and even if a steel containing REM and a welding material containing Te are used, a preheating between 50° and 100° C is required for prevention of the cracking if they are not used in combination so that the desired results of the present invention cannot be obtained.

The welded products No. 1 to No. 4 and No. 8 to No. 10 according to the present invention show the remarkable advantage that they are completely free from cracking even when welded at ordinary temperatures, which advantage cannot be expected from the conventional art, and the present invention has a further advantage that no cracking of the weld metal is caused.

In a similar way, the Y-groove cracking tests were done on welded products obtained by using a commercially available covered electrode (equivalent to AWS E 11016-G), but containing 0.05% of Se in the core wire, and the steel B in Table 1, and by using the similar electrode but containing 0.3% of Se in the coating material and the steel B in Table 1.

The results revealed that no weld cracking was seen even when the welding was done without preheating (thus at 20° C) just as in case of using the covered electrode containing Te. The weld metals thus obtained contained 0.006% Se and 0.015% Te respectively and 0.008% REM, which are within the scope of the present invention.

EXAMPLE 2

Table 4 shows chemical compositions of the steel used for the tests, and their mechanical properties, and Table 5 shows welding materials used and methods for addition of Te and Se. Table 6 shows chemical compositions of weld metals of the welded steel products thus obtained and results of weld cracking tests. As for the method of the weld cracking test, the Y-groove cracking test was done in case of the semi-automatic welding, and the window-type restrained cracking test was done in case of the submerged arc welding.

No. 1 to No. 13 and No. 20 to No. 22, which are within the scope of the present invention, show that no cracking is caused by welding at room temperature without preheating irrespective of the welding method. No. 14 to No. 19, which were obtained using either or both of a conventional base steel material and a conventional welding material, require a preheating at 75° C or higher under the same test conditions.

As clearly understood from the foregoing examples, the present invention has remarkable advantages.

Table 1

| No. | C | Si | Mn | Cu | Ni | Cr | Mo | V | Alsol | B | Ti | REM | Plate Thickness mm | $\sigma_B$ Kg/mm² | 2 mm V Charpy vEo Kg-m | vTrs °C | Remarks |
|-----|------|------|------|------|------|------|------|------|------|-------|-------|-------|------|------|------|------|------|
| A1 | 0.11 | 0.32 | 0.95 | 0.25 | — | 0.83 | 0.44 | 0.03 | 0.05 | 0.001 | — | 0.021 | 25 | 84.3 | 21 | −105 | Present Invention |
| A2 | 0.12 | 0.28 | 0.85 | 0.23 | — | 0.79 | 0.46 | 0.04 | 0.03 | 0.002 | — | 0.036 | 25 | 82.5 | 19 | −93 | " |
| A3 | 0.11 | 0.35 | 0.77 | 0.22 | 1.01 | 0.54 | 0.38 | 0.05 | 0.06 | 0.001 | 0.040 | 0.018 | 38 | 84.6 | 23 | −112 | " |
| A4 | 0.11 | 0.29 | 0.85 | 0.25 | — | 0.76 | 0.48 | 0.04 | 0.05 | 0.001 | — | — | 25 | 83.5 | 18 | −90 | Conventional |

(Chemical Composition: % by weight)

Table 2

| No. | Electrode Diameter | Core Wire C | Si | Mn | Te | Coating Material CaCO₃ | CaF₂ | Fe—Si | Fe—Ti | Mn | Ni | Fe—Mo | Cr | Te | Remarks |
|-----|------|------|------|------|------|------|------|------|------|------|------|------|------|------|------|
| B1 | 4 φ | 0.01 | 0.01 | 0.55 | — | 42 | 16 | 12 | 3.5 | 3.5 | 7.0 | 2 | 0.4 | 0.5 | Present Invention |
| B2 | " | 0.02 | " | 0.58 | 0.05 | 44 | 15 | 12 | 3.1 | 4.0 | 6.8 | 2 | 0.5 | 0.2 | " |
| B3 | " | 0.01 | " | 0.50 | — | 45 | 16 | 13 | 2 | 4.5 | 7.0 | 2 | 0.5 | — | Conventional |
| B0 | " | 0.01 | 0.01 | 0.56 | — | 43 | 16 | 13 | 3.5 | 4.0 | 7.0 | 2 | 0.5 | 0.3 | Present Invention |

(Chemical Composition: % by weight)

Table 3

| No. | C | Si | Mn | Ni | Cr | Mo | Al | REM | Te | Addition(gr) per 100g of Weld Metal | Plate Thickness mm | Welding Method & Combination of Steels | Temperature for prevention of root cracking (°C) | Remarks |
|-----|------|------|------|------|------|------|------|-------|-------|------|------|------|------|------|
| 1 | 0.07 | 0.40 | 0.93 | 2.6 | 0.15 | 0.45 | 0.01 | 0.015 | 0.008 | 0.06 | 25 | A1-B1 | ≦20 | Present Invention |
| 2 | 0.06 | 0.42 | 0.88 | 2.5 | 0.20 | 0.43 | 0.02 | 0.016 | 0.018 | 0.10 | " | A1-B2 | " | " |
| 3 | 0.06 | 0.38 | 0.91 | 2.3 | 0.18 | 0.45 | 0.01 | 0.015 | 0.011 | 0.06 | " | A2-B1 | " | " |
| 4 | 0.07 | 0.41 | 0.95 | 2.2 | 0.16 | 0.40 | 0.02 | 0.021 | 0.021 | 0.10 | 38 | A3-B2 | " | " |
| 5 | 0.07 | 0.42 | 0.94 | 2.5 | 0.20 | 0.44 | 0.01 | 0.015 | — | — | 25 | A1-B3 | 100 | Conventional Steel |

Table 3-continued

| No. | C | Si | Mn | Ni | Cr | Mo | Al | REM | Te | Addition(gr) per 100g of Weld Metal | Plate Thickness mm | Welding Method & Combination of Steels | Temperature for prevention of root cracking (°C) | Remarks |
|---|---|---|---|---|---|---|---|---|---|---|---|---|---|---|
| 6 | 0.06 | 0.43 | 0.91 | 2.7 | 0.20 | 0.46 | " | — | 0.016 | 0.10 | " | A4-B2 | 75 | " |
| 7 | 0.07 | 0.38 | 0.96 | 2.6 | 0.21 | 0.43 | " | — | — | — | " | A4-B3 | 125 | " |
| 8 | 0.07 | 0.35 | 1.19 | 2.5 | 0.20 | 0.48 | 0.01 | 0.006 | 0.003 | 0.06 | 25 | A2-B2 | ≦20 | Present Invention |
| 9 | 0.07 | 0.40 | 1.15 | 2.3 | 0.19 | 0.50 | " | 0.003 | 0.005 | 0.09 | " | A2-B0 | " | " |
| 10 | 0.06 | 0.35 | 1.28 | 2.5 | 0.22 | 0.45 | " | 0.001 | 0.002 | 0.09 | 38 | A3-B0 | " | " |

(Chemical composition: % by weight)

Table 4

| No. | C | Si | Mn | Cu | Ni | Cr | Mo | V | Nb | Al-sol | B | REM | Others | Plate Thickness mm | σB Kg/mm² | 2mm V Charpy vEo Kg-m | 2mm V Charpy vTrs °C | Remarks |
|---|---|---|---|---|---|---|---|---|---|---|---|---|---|---|---|---|---|---|
| A5 | 0.17 | 0.35 | 1.41 | — | — | — | — | — | — | — | — | 0.05 | — | 30 | 51 | 18 | −48 | |
| A6 | 0.16 | 0.45 | 1.50 | 0.25 | — | — | — | — | — | — | 0.02 | — | 0.03 | — | 30 | 55 | 19 | −60 | |
| A7 | 0.13 | 0.35 | 1.37 | 0.30 | — | 0.30 | 0.25 | 0.03 | 0.05 | 0.03 | 0.001 | 0.02 | Ti 0.03 | 30 | 65 | 21 | −74 | Present Invention |
| A8 | 0.12 | 0.26 | 0.90 | 0.22 | — | 0.80 | 0.45 | 0.03 | — | 0.03 | 0.001 | 0.015 | — | 30 | 84 | 22 | −93 | |
| A9 | 0.11 | 0.25 | 0.86 | 0.25 | 1.01 | 0.48 | 0.35 | 0.04 | — | 0.05 | 0.002 | 0.03 | Ca 0.004 | 50 | 83 | 21 | −115 | |
| A10 | 0.13 | 0.25 | 0.89 | 0.23 | — | 0.79 | 0.50 | 0.04 | — | 0.03 | " | 0.04 | Zr 0.02 | 38 | 86 | 20 | −105 | |
| A11 | 0.12 | 0.28 | 0.91 | 0.27 | — | 0.82 | 0.43 | 0.03 | — | 0.06 | " | — | — | 30 | 83 | 18 | −90 | Conventional |

(Chemical Composition: % by weight)

Table 5

| No. | Welding Method | Wire C | Si | Mn | Cu | Ni | Cr | Mo | Te | Se | Others | Flux(Main components) SiO₂ | CaO | MnO | Al₂O₃ | MgO | Te | Se | Remarks |
|---|---|---|---|---|---|---|---|---|---|---|---|---|---|---|---|---|---|---|---|
| B4 | *1 | 0.08 | 0.04 | 1.58 | 0.02 | — | — | — | 0.03 | — | — | 41 | 26 | 15 | 2 | 6 | — | — | |
| B5 | Submerged Arc Welding | 0.09 | 0.15 | 2.10 | " | 1.05 | — | 0.45 | — | 0.04 | Ti 0.14 | 43 | 22 | 16 | 2 | 8 | — | — | Present Invention |
| B6 | | 0.10 | 0.25 | 1.50 | " | 2.51 | 0.35 | 0.48 | 0.05 | — | — | 45 | 19 | 16 | 3 | 7 | 0.2 | — | |
| B7 | " | 0.09 | 0.30 | 1.35 | 0.06 | 2.31 | 0.40 | 0.44 | 0.04 | 0.05 | — | 40 | 25 | 16 | 3 | 6 | — | — | |
| B8 | " | 0.10 | 0.25 | 1.28 | " | 2.50 | 0.38 | 0.50 | — | — | — | 42 | 25 | 16 | 2 | 6.5 | — | — | Comparison |
| B9 | *2 | 0.07 | 0.55 | 1.63 | — | — | — | — | 0.05 | — | — | | | | | | | | |
| B10 | Semi-Automatic Welding | 0.08 | 0.33 | 1.36 | 0.06 | — | — | 0.63 | 0.03 | 0.02 | Zr 0.18 | Ar + 2% O₂ | | | | | | | Present Invention |
| B11 | | 0.09 | 0.60 | 1.55 | " | 2.29 | 0.35 | 0.60 | — | 0.05 | — | | | | | | | | |
| B12 | | 0.08 | 0.75 | 1.55 | 0.04 | 2.52 | 0.42 | 0.55 | 0.08 | — | — | | | | | | | | |
| B13 | " | 0.07 | 0.46 | 1.35 | 0.07 | 2.20 | — | 0.45 | — | — | — | | | | | | | | Comparison |
| B14 | Submerged Arc *1 Welding | 0.09 | 0.30 | 1.38 | 0.06 | 2.60 | 0.50 | 0.45 | — | — | — | 40 | 25 | 15 | 2 | 7 | 0.3 | — | Present Invention |

(Chemical Composition: % by weight)
Welding Conditions
*1 650A -35V -30cm/min Wire Diameter 4 φ
*2 180A -27V -16cm/min Wire Diameter 1.2 φ

Table 6

| No. | Plate Thickness | C | Si | Mn | Cu | Ni | Cr | Mo | REM | Te | Se | Welding Method and Combination of Steel | Pre-heating Temperature for prevention of cracking (°C) Y-groove cracking test | Window-type restrain cracking test | Remarks |
|---|---|---|---|---|---|---|---|---|---|---|---|---|---|---|---|
| 1 | 30 | 0.12 | 0.37 | 1.28 | — | — | — | — | 0.031 | 0.013 | — | A5-B4 | — | ≦20 | |
| 2 | 30 | 0.12 | 0.33 | 1.10 | — | — | — | — | 0.025 | 0.012 | — | A5-B9 | ≦20 | — | |
| 3 | 30 | 0.11 | 0.44 | 1.20 | 0.15 | — | 0.18 | 0.40 | 0.015 | 0.010 | 0.005 | A6-B10 | " | — | |
| 4 | 30 | 0.09 | 0.38 | 1.32 | 0.10 | 0.72 | — | 0.45 | 0.011 | — | 0.008 | A7-B5 | — | ≦20 | |
| 5 | 30 | 0.09 | 0.41 | 1.18 | 0.11 | — | 0.16 | 0.48 | 0.010 | 0.011 | 0.006 | A7-B10 | ≦20 | — | |
| 6 | 30 | 0.09 | 0.21 | 1.19 | 0.16 | 2.10 | 0.55 | 0.60 | 0.008 | 0.021 | — | A8-B6 | — | ≦20 | Present Invention |
| 7 | 50 | 0.09 | 0.23 | 1.22 | 0.18 | 2.55 | 0.60 | 0.65 | 0.012 | 0.010 | 0.012 | A9-B7 | — | " | |
| 8 | 50 | 0.09 | 0.25 | 1.23 | 0.11 | 2.65 | 0.54 | 0.60 | 0.013 | 0.021 | — | A9-B12 | ≦20 | — | |
| 9 | 30 | 0.08 | 0.23 | 1.18 | 0.10 | 2.16 | 0.48 | 0.58 | 0.007 | 0.012 | — | A8-B12 | " | — | |
| 10 | 30 | 0.09 | 0.20 | 1.20 | 0.12 | 2.10 | 0.61 | 0.60 | 0.025 | — | 0.011 | A8-B11 | " | — | |
| 11 | 38 | 0.10 | 0.21 | 1.21 | 0.10 | 2.05 | 0.55 | 0.60 | 0.021 | 0.018 | — | A10-B12 | " | — | |
| 12 | 38 | 0.09 | 0.25 | 1.25 | 0.09 | 2.03 | 0.60 | 0.67 | 0.026 | 0.009 | 0.011 | A10-B7 | — | ≦20 | |
| 13 | 30 | 0.09 | 0.21 | 1.22 | 0.13 | 2.11 | 0.58 | 0.61 | 0.009 | 0.010 | 0.010 | A8-B7 | " | — | |
| 14 | 30 | 0.09 | 0.25 | 1.25 | 0.14 | 2.11 | 0.58 | 0.60 | — | 0.019 | — | A11-B6 | — | 100 | |
| 15 | 30 | 0.08 | 0.21 | 1.23 | 0.10 | 2.01 | 0.60 | 0.62 | — | 0.014 | 0.011 | A11-B10 | 75 | — | |
| 16 | 30 | 0.09 | 0.20 | 1.19 | 0.11 | 2.10 | 0.61 | 0.65 | — | — | — | A11-B8 | — | 100 | Comparison |
| 17 | 30 | 0.09 | 0.21 | 1.21 | 0.13 | 2.15 | 0.56 | 0.63 | 0.015 | — | — | A8-B8 | — | 75 | |
| 18 | 50 | 0.09 | 0.23 | 1.28 | 0.15 | 2.08 | 0.61 | 0.64 | 0.018 | — | — | A9-B13 | 125 | — | |

Table 6-continued

| No. | Plate Thick-ness | C | Si | Mn | Cu | Ni | Cr | Mo | REM | Te | Se | Welding Method and Combina-tion of Steel | Pre-heating Temperature for prevention of cracking (° C) | | Remarks |
| --- | --- | --- | --- | --- | --- | --- | --- | --- | --- | --- | --- | --- | --- | --- | --- |
| | | | | | | | | | | | | | Y-groove cracking test | Window-type restrain crack-ing test | |
| 19 | 30 | 0.09 | 0.19 | 1.19 | 0.15 | 2.10 | 0.58 | 0.61 | — | — | — | A11-B13 | 75 | — | |
| 20 | 30 | 0.09 | 0.22 | 1.21 | 0.10 | 2.30 | 0.58 | 0.58 | 0.001 | 0.003 | — | A8-B14 | — | ≦20 | Present Invention |
| 21 | 50 | 0.10 | 0.23 | 1.25 | 0.16 | 2.10 | 0.61 | 0.60 | 0.004 | 0.004 | — | A9-B14 | — | " | |
| 22 | 38 | 0.09 | 0.20 | 1.18 | 0.15 | 2.05 | 0.60 | 0.58 | 0.003 | 0.002 | — | A10-B14 | — | " | |

(Chemical Composition: % by weight)
(1)Analysis of REM was performed by the neo-thorin photometric method.
(2)Analysis of Te was performed by the bismethiol II photometric method.
(3)Analysis of Se was performed by the 3.3′-diaminobenzidine photometric method.

What is claimed is:

1. A welded steel product having a low sensitivity to weld cracking, produced by welding a base steel material consisting essentially of 0.02 to 0.20% of carbon, 0.1 to 1.0% of silicon, 0.3 to 3.0% of manganese, 0.005 to 0.30% in total of at least one rare earth metal element and 0.005 to 0.20% in total of at least one element selected from tellurium and selenium, with the balance being iron and unavoidable impurities, said welded steel product having a weld metal consisting essentially of not more than 0.20% of carbon, not more than 1.0% of silicon, 0.3 to 5.0% of manganese, 0.0005 to 0.10% in total of at least one rare earth metal element and 0.005 to 0.10% in total of at least one element selected from tellurium and selenium, with the balance being iron and unavoidable impurities.

2. A welded steel product having a low sensitivity to weld cracking, produced by welding a base steel material consisting essentially of 0.02 to 0.20% of carbon, 0.1 to 1.0% of silicon, 0.3 to 3.0% of manganese, 0.005 to 0.30% in total of at least one rare earth metal element, 0.005 to 0.20% in total of at least one element selected from tellurium and selenium, and at least one member selected from the group consisting of 0.05 to 2.0% of copper, 0.05 to 6.0% of nickel, 0.05 to 3.0% of chromium, 0.05 to 2.0% of molybdenum, 0.01 to 0.10% of vanadium, 0.01 to 0.10% of niobium, 0.01 to 0.12% of soluble aluminium, 0.0005 to 0.005% of boron, 0.01 to 0.12% of titanium, 0.01 to 0.12% of zirconium and 0.0005 to 0.01% of calcium, with the balance being iron and unavoidable impurities, said welded steel product having a weld metal consisting essentially of not more than 0.20% of carbon, not more than 1.0% of silicon, 0.3 to 5.0% of manganese, 0.0005 to 0.10% in total of at least one rare earth metal element, 0.0005 to 0.10% in total of at least one element selected from tellurium and selenium, not more than 1.0% of copper, not more than 3% of chromium, not more than 10% of nickel, not more than 3.0% of molybdenum, not more than 0.12% of titanium and not more than 0.12% of zirconium, with the balance being iron and unavoidable impurities.

3. A welded steel product having a low sensitivity to weld cracking produced by welding a base steel material consisting essentially of 0.02 to 0.20% of carbon, 0.1 to 1.0% of silicon, 0.3 to 3.0% of manganese and 0.005 to 0.30% in total of at least one rare earth metal element, with the balance being iron and unavoidable impurities, with the use of a welding material containing 0.005 to 5.0% in total of at least one element selected from tellurium and selenium, said welded steel product having a weld metal consisting essentially of not more than 0.20% of carbon, not more than 1.0% of silicon, 0.3 to 5.0% of manganese, 0.0005 to 0.10% in total of at least one rare earth metal element and 0.0005 to 0.10% in total of at least one element selected from tellurium and selenium, with the balance being iron and unavoidable impurities.

4. A welded steel product having a low sensitivity to weld cracking produced by welding a base steel material consisting essentially of 0.02 to 0.20% of carbon, 0.1 to 1.0% of silicon, 0.3 to 3.0% of manganese, 0.005 to 0.30% in total of at least one rare earth metal element, and at least one member selected from the group consisting of 0.05 to 2.0% of copper, 0.05 to 6.0% of nickel, 0.05 to 3.0% of chromium, 0.05 to 2.0% of molybdenum, 0.01 to 0.10% of vanadium, 0.01 to 0.10% of niobium, 0.01 to 0.12% of soluble aluminium, 0.0005 to 0.005% of boron, 0.01 to 0.12% of titanium, 0.01 to 0.12% of zirconium and 0.0005 to 0.01% of calcium, with the balance being iron and unavoidable impurities, with the use of a welding material containing 0.005 to 5.0% in total of at least one element selected from tellurium and selenium, said welded steel product having a weld metal consisting essentially of not more than 0.20% of carbon, not more than 1.0% of silicon, 0.3 to 5.0% of manganese, 0.0005 to 0.10% in total of at least one rare earth metal element, 0.0005 to 0.10% in total of at least one element selected from tellurium and selenium, not more than 1.0% of copper, not more than 3% of chromium, not more than 10% of nickel, not more than 3.0% of molybdenum, not more than 0.12% of titanium and not more than 0.12% of zirconium, with the balance being iron and unavoidable impurities.

5. A welded steel product having a low sensitivity to weld cracking, produced by welding a base steel material consisting essentially of 0.02 to 0.20% of carbon, 0.1 to 1.0% of silicon, 0.3 to 3.0% of manganese and 0.0001 to 0.01% in total of at least one element selected from calcium and barium, with the balance being iron and unavoidable impurities, with the use of a welding material containing 0.005 to 5.0% in total of at least one element selected from tellurium and selenium, said welded steel product having a weld metal consisting essentially of not more than 0.20% of carbon, not more than 1.0% of silicon, 0.3 to 5.0% of manganese, 0.0005 to 0.10% in total of at least one element selected from tellurium and selenium and not more than 0.005% in total of at least one element selected from calcium and barium, with the balance being iron and unavoidable impurities.

6. A welded steel product having a low sensitivity to weld cracking, produced by welding a base steel material consisting essentially of 0.02 to 0.20% of carbon, 0.1 to 1.0% of silicon, 0.3 to 3.0% of manganese, 0.0001 to 0.01% in total of at least one element selected from calcium and barium, and at least one member selected from the group consisting of 0.05 to 2.0% of copper, 0.05 to 6.0% of nickel, 0.05 to 3.0% of chromium, 0.05 to 2.0% of molybdenum, 0.01 to 0.10% of vanadium, 0.01 to 0.10% of niobium, 0.01 to 0.12% of soluble aluminium, 0.0005 to 0.005% of boron, 0.01 to 0.12% of titanium and 0.01 to 0.12% of zirconium, with a balance being iron and unavoidable impurities, with the use of a welding material containing 0.005 to 5.0% in total of at least one element selected from tellurium and selenium, said welded steel product having a weld metal consisting essentially of not more than 0.20% of carbon, not more than 1.0% of silicon, 0.3 to 5.0% of manganese, not more than 0.005% in total of at least one element selected from calcium and barium, 0.0005 to 0.10% in total of at least one element selected from tellurium and selenium, not more than 1.0% of copper, not more than 3% of chromium, not more than 10% of nickel, not more than 3.0% of molybdenum, not more than 0.12% of titanium and not more than 0.12% of zirconium, with the balance being iron and unavoidable impurities.

* * * * *